(12) United States Patent
Lee et al.

(10) Patent No.: US 11,929,458 B2
(45) Date of Patent: Mar. 12, 2024

(54) SEPARATOR HAVING INORGANIC COATING LAYER INCLUDING SMALL WEIGHT AVERAGE MOLECULAR WEIGHT AND LOW MELTING POINT PVDF, AND METHOD FOR MANUFACTURING THE SAME

(71) Applicant: LG Chem, Ltd., Seoul (KR)

(72) Inventors: Joo-Sung Lee, Daejeon (KR); A-Young Lee, Daejeon (KR)

(73) Assignee: LG Chem, Ltd. (KR)

( * ) Notice: Subject to any disclaimer, the term of this patent is extended or adjusted under 35 U.S.C. 154(b) by 645 days.

(21) Appl. No.: 16/982,838

(22) PCT Filed: Jul. 15, 2019

(86) PCT No.: PCT/KR2019/008720
§ 371 (c)(1),
(2) Date: Sep. 21, 2020

(87) PCT Pub. No.: WO2020/013675
PCT Pub. Date: Jan. 16, 2020

(65) Prior Publication Data
US 2021/0057705 A1  Feb. 25, 2021

(30) Foreign Application Priority Data

Jul. 13, 2018 (KR) .......... 10-2018-0081891
Oct. 31, 2018 (KR) .......... 10-2018-0132497

(51) Int. Cl.
*H01M 10/0525* (2010.01)
*H01M 50/403* (2021.01)
(Continued)

(52) U.S. Cl.
CPC ..... *H01M 10/0525* (2013.01); *H01M 50/403* (2021.01); *H01M 50/443* (2021.01);
(Continued)

(58) Field of Classification Search
CPC ............ H01M 50/489; H01M 50/403; H01M 50/4091; H01M 50/457; H01M 50/446;
(Continued)

(56) References Cited

U.S. PATENT DOCUMENTS 7,635,513 B1 * 12/2009 Hoshuyama ............ B32B 27/22
264/28
2002/0197413 A1 12/2002 Daido et al.
(Continued)

FOREIGN PATENT DOCUMENTS

CN 104393232 A 3/2015
EP 3764425 A1 1/2021
(Continued)

OTHER PUBLICATIONS

Solvay, Solef® PVDF for Flexible Battery Separators, 2013 (Year: 2013).*
(Continued)

*Primary Examiner* — Sean P Cullen
(74) *Attorney, Agent, or Firm* — Lerner David LLP

(57) ABSTRACT

A separator having low resistance, suitable porosity and electrolyte retention while ensuring heat resistance is provided. The separator includes a porous substrate and a low-resistance coating layer formed on at least one surface of the porous substrate, wherein the low-resistance coating layer includes node(s) containing inorganic particles and a polymer resin covering at least a part of the surfaces of inorganic particles, and filament(s) formed from the polymer resin of the node in a thread-like shape, at least one filament extended from one node is formed, and the filaments are arranged in such a manner that they connect one node with another node.

14 Claims, 4 Drawing Sheets

(51) Int. Cl.
- *H01M 50/443* (2021.01)
- *H01M 50/446* (2021.01)
- *H01M 50/451* (2021.01)
- *H01M 50/457* (2021.01)
- *H01M 50/489* (2021.01)
- *H01M 50/491* (2021.01)

(52) U.S. Cl.
CPC ....... *H01M 50/446* (2021.01); *H01M 50/451* (2021.01); *H01M 50/457* (2021.01); *H01M 50/489* (2021.01); *H01M 50/491* (2021.01)

(58) Field of Classification Search
CPC ............. H01M 50/443; H01M 50/451; H01M 10/0525
USPC .......................................... 429/144, 251, 254
See application file for complete search history.

(56) References Cited

U.S. PATENT DOCUMENTS

| | | | |
|---|---|---|---|
| 2007/0178384 | A1 | 8/2007 | Kajita et al. |
| 2012/0115036 | A1 | 5/2012 | Lee et al. |
| 2013/0089772 | A1* | 4/2013 | Nishikawa .......... H01M 50/426 977/773 |
| 2014/0370358 | A1 | 12/2014 | Hong et al. |
| 2015/0179997 | A1 | 6/2015 | Iwai et al. |
| 2015/0200388 | A1 | 7/2015 | Yoshitomi |
| 2015/0303427 | A1 | 10/2015 | Hyun et al. |
| 2015/0380707 | A1 | 12/2015 | Iwai et al. |
| 2018/0034025 | A1 | 2/2018 | Lee et al. |
| 2018/0071774 | A1* | 3/2018 | Honmoto ................. C08J 7/043 |
| 2018/0093459 | A1* | 4/2018 | Honmoto ........... B01J 20/28054 |
| 2018/0190957 | A1 | 7/2018 | Honda et al. |
| 2019/0131604 | A1 | 5/2019 | Yoon et al. |

FOREIGN PATENT DOCUMENTS

| | | | | |
|---|---|---|---|---|
| JP | H09500485 | A | 1/1997 | |
| JP | 2003171495 | A | 6/2003 | |
| JP | 2009057463 | A | 3/2009 | |
| JP | 4988972 | B1 | 8/2012 | |
| JP | 2013020769 | A | 1/2013 | |
| JP | 2013054972 | A | 3/2013 | |
| JP | 5612797 | B1 | 10/2014 | |
| JP | 2017183212 | A * | 10/2017 | ............ C08J 5/2237 |
| KR | 20030027754 | A | 4/2003 | |
| KR | 101173202 | B1 | 8/2012 | |
| KR | 101298340 | B1 | 8/2013 | |
| KR | 101344939 | B1 | 12/2013 | |
| KR | 20140060800 | A | 5/2014 | |
| KR | 20140112666 | A | 9/2014 | |
| KR | 20150001148 | A * | 1/2015 | ............. H01M 2/16 |
| KR | 20160032922 | A | 3/2016 | |
| KR | 20160069386 | A | 6/2016 | |
| KR | 20160129598 | A | 11/2016 | |
| KR | 20170016904 | A * | 2/2017 | ............. H01M 2/16 |
| KR | 20170037556 | A | 4/2017 | |
| KR | 20170068979 | A | 6/2017 | |
| KR | 20180018408 | A | 2/2018 | |
| KR | 101996642 | B1 | 7/2019 | |
| WO | 9515589 | A1 | 6/1995 | |
| WO | 2014021291 | A1 | 2/2014 | |
| WO | 2014021292 | A1 | 2/2014 | |
| WO | 2016175605 | A1 | 11/2016 | |
| WO | 2017002947 | A1 | 1/2017 | |

OTHER PUBLICATIONS

Nipoon Light Metal Company, Reactive Alumina, Low Shrinkage Alumina, 2023 (Year: 2023).*
Search Report from International Application No. PCT/KR2019/008720, dated Oct. 25, 2019.
Thierry Michot et al., Electrochemical properties of polymer gel electrolytes based on poly(vinylidene fluoride) copolymer and homopolymer, Electrochimica Acta 45, Jan. 2000, 1347-1360 pages.
Liu Xiaohao, Preparation and Characterization of Poly(vinylidene fluoride) Composite Porous Membranes, May 2016, Southwest Jiaotong University Master Degree Thesis. 1-83 pages.
Dent, Thomas: "GPC/SEC Practical Tips and Tricks", Oct. 1, 2011 (Oct. 1, 2011), 38 pages.
Extended European Search Report for Application No. EP19833740, dated Jun. 25, 2021, 13 pages.
Nicolas Fedelich: "Application Handbook Thermal Analysis of Polymers Selected Applications Thermal Analysis", Jan. 1, 2013, 35 pages.
Pastorino David et al: "Multiple characterization study on porosity and pore structure of calcium phosphate cements", 1-15 Acta Biomaterialia, vol. 28, 1 Dec. 1, 2015, pp. 205-214.
Malvern Instruments Worldwide, "A Basic Guide to Particle Characterization", White Paper, May 2, 2012, XP055089322, pp. 1-26.

* cited by examiner

SEPARATOR HAVING INORGANIC COATING LAYER INCLUDING SMALL WEIGHT AVERAGE MOLECULAR WEIGHT AND LOW MELTING POINT PVDF, AND METHOD FOR MANUFACTURING THE SAME

CROSS-REFERENCE TO RELATED APPLICATIONS

The present application is a national phase entry under 35 U.S.C. § 371 of International Application No. PCT/KR2019/008720, which claims priority from Korean Patent Application No. 10-2018-0081891 filed on Jul. 13, 2018 and Korean Patent Application No. 10-2018-0132497 filed on Oct. 31, 2018 in the Republic of Korea, the entire contents of which are incorporated herein by reference.

TECHNICAL FIELD

The present disclosure relates to a separator for an electrochemical device, wherein the electrochemical device may be a primary battery or secondary battery, and the secondary battery includes a lithium ion secondary battery.

BACKGROUND ART

Non-aqueous secondary batteries represented by lithium ion secondary batteries have been used widely as power sources of portable electronic instruments, such as notebook computers, cellular phones, digital camera, camcorders, or the like. In addition, recently, such batteries have been examined about their application to vehicles by virtue of their characteristic high energy density.

As portable electronic instruments have been downsized and weight-lightened, casings for non-aqueous secondary batteries have been simplified. Initially, battery cans made of stainless steel have been used as casings. However, since casings made of aluminum cans were developed, soft pack casings made of aluminum laminate packs have been developed more recently. In the case of soft pack casings made of aluminum laminate, the casings are flexible and thus a gap may be formed between an electrode and a separator during charge/discharge, thereby causing a technical problem of degradation of cycle life. To solve the problem, technology for adhesion of an electrode with a separator is important and may suggestions have been made about such technology.

As one of the suggestions, there is known use of a separator including a porous layer (also referred to as an adhesive porous layer hereinafter) including a polyvinylidene fluoride resin formed on a conventional separator, i.e. polyolefin microporous membrane. The adhesive porous layer can function as adhesive, since it allows good adhesion of an electrode with a separator, when it is stacked on an electrode with an electrolyte present therein and subjected to hot pressing. As a result, it is possible to improve the cycle life of a battery.

In addition, when a battery is manufactured by using a conventional metallic can casing, a battery device is obtained by stacking electrodes and a separator and winding them, and the device is sealed in a metallic can casing together with an electrolyte to obtain a battery. Meanwhile, when a soft pack battery is manufactured by using a conventional separator, a battery device is obtained in the same manner as the battery using the metallic can casing, the device is sealed in a soft pack casing together with an electrolyte, and finally a hot pressing process is carried out to obtain a battery. Therefore, when using the separator having such an adhesive porous layer, a battery device can be obtained in the same manner as the battery using the metallic can casing. Thus, there is a merit in that no significant modification is required in addition to a conventional process for manufacturing a battery using a metallic can casing.

In this context, many technical suggestions have been made to date about separators including an adhesive porous layer stacked on a polyolefin microporous membrane. For example, with a view to ensuring sufficient adhesive property and coexistence of ion permeability, novel technical suggestions have been made considering the porous structure and thickness of a polyvinylidene fluoride resin layer.

DISCLOSURE

Technical Problem

The present disclosure provides a separator which has low resistance and suitable porosity and electrolyte retention, while ensuring heat resistance, and a method for manufacturing the same. In addition, it will be easily understood that the objects and advantages of the present disclosure may be realized by the means shown in the appended claims and combinations thereof.

Technical Solution

In one aspect of the present disclosure, a method for manufacturing a separator and a separator obtained thereby are provided in order to solve the above-mentioned technical problem.

According to the first embodiment of the present disclosure, there is provided a method for manufacturing a separator, which includes (S1) preparing slurry for an inorganic coating layer including a solvent, inorganic particles and a binder resin; (S2) applying the slurry for an inorganic coating layer to at least one surface of a porous substrate; and (S3) dipping the product of step (S2) in a solidifying solution containing a non-solvent, wherein the binder resin in step (S1) includes a polyvinylidene fluoride (PVdF)-based binder resin in an amount of 80 wt % or more based on 100 wt % of the binder resin, the PVdF-based binder resin has a molecular weight (Mw) of 600,000 or less and a melting point (Tm) of 140° C. or less, the binder resin and the inorganic particles are introduced to the slurry at a weight ratio of 30:70-60:40, step (S3) is carried out once, or twice or more, and the initial solidifying solution is controlled to a temperature equal to or higher than 5° C. and less than 20° C.

According to the second embodiment of the present disclosure, there is provided the method for manufacturing a separator as defined in the first embodiment, wherein the PVdF-based binder resin includes vinylidene fluoride homopolymer, copolymer of vinylidene fluoride with another copolymerizable monomer, or a mixture thereof, and the copolymer of vinylidene fluoride with another copolymerizable monomer includes 70 mol % or more of vinylidene fluoride as polymerization unit and has a degree of substitution with another copolymerizable monomer of 5 mol % or more.

According to the third embodiment of the present disclosure, there is provided the method for manufacturing a separator as defined in the first or the second embodiment, wherein the solidifying solution in step (S3) includes the non-solvent in an amount of 95 wt % or more based on 100 wt % or the solidifying solution.

According to the fourth embodiment of the present disclosure, there is provided the method for manufacturing a separator as defined in any one of the first to the third embodiments, wherein the porous substrate includes a thermoplastic resin having a melting point less than 200° C., and has a thickness of 4-15 μm and a porosity of 30-70%.

According to the fifth embodiment of the present disclosure, there is provided the method for manufacturing a separator as defined in any one of the first to the fourth embodiments, wherein the separator shows an increase in air permeation time less than 40% based on the air permeation time of the porous substrate, and the increase in air permeation time is determined according to the following Formula 1:

Increase in air permeation time (%)={(Air permeation time of separator−Air permeation of porous substrate)/Air permeation time of porous substrate}×100    [Formula 1]

According to the sixth embodiment of the present disclosure, there is provided the method for manufacturing a separator as defined in any one of the first to the fifth embodiments, wherein the inorganic particles cause no oxidation and/or reduction in the operating voltage range (0-5V based on $Li/Li^+$) of an electrochemical device, and have an average particle diameter ($D_{50}$) of 0.1-2.5 μm.

According to the seventh embodiment of the present disclosure, there is provided the method for manufacturing a separator as defined in any one of the first to the sixth embodiments, wherein the solvent is capable of dissolving 10 wt % or more of the PVdF-based binder resin at 25° C., and includes at least one selected from N-methyl pyrrolidone, dimethyl acetamide and dimethyl formamide.

According to the eighth embodiment of the present disclosure, there is provided the method for manufacturing a separator as defined in any one of the first to the seventh embodiments, wherein step (S3) is carried out by preparing two or more types of solidifying solutions and dipping the product of step (S2) in each type of solidifying solution sequentially for a predetermined time.

According to the ninth embodiment of the present disclosure, there is provided the method for manufacturing a separator as defined in the eighth embodiments, wherein the initial solidifying solution includes the non-solvent in an amount of 95 wt % or more based on 100 wt % of the solidifying solution, and the content of non-solvent in the solidifying solution used later is higher than the content of non-solvent in the initial solidifying solution.

According to the tenth embodiment of the present disclosure, there is provided the method for manufacturing a separator as defined in any one of the first to the ninth embodiments, wherein the initial solidifying solution is controlled to a temperature equal to or higher than 5° C. and less than 20° C., and the solidifying solution used later is controlled to a temperature higher than the temperature of the initial solidifying solution within a range up to the highest temperature of 40° C.

In another aspect of the present disclosure, there is also provided a separator obtained by the method as defined in any one of the first to the tenth embodiments. According to the eleventh embodiment of the present disclosure, there is provided a separator including a porous substrate and a low-resistance coating layer formed on at least one surface of the porous substrate, wherein the low-resistance coating layer includes inorganic particles and a binder resin, the separator shows an increase in air permeation time less than 40% as determined according to the following Formula 1, and the low-resistance coating layer includes the binder resin and inorganic particles at a weight ratio of 30:70-60:40:

Increase in air permeation time (%)={(Air permeation time of separator−Air permeation of porous substrate)/Air permeation time of porous substrate}×100    [Formula 1]

According to the twelfth embodiment of the present disclosure, there is provided the separator as defined in the eleventh embodiment, wherein the binder resin includes a polyvinylidene fluoride-based binder resin, and the PVdF-based binder resin is present in an amount of 80 wt % or more based on 100 wt % of the total binder resin and has a weight average molecular weight of 600,000 or less.

According to the thirteenth embodiment of the present disclosure, there is provided the separator as defined in the eleventh or the twelfth embodiment, wherein the PVdF-based binder resin includes vinylidene fluoride homopolymer, copolymer of vinylidene fluoride with another copolymerizable monomer, or a mixture thereof.

According to the fourteenth embodiment of the present disclosure, there is provided the separator as defined in any one of the eleventh to the thirteenth embodiments, wherein the monomer copolymerizable with vinylidene fluoride includes at least one selected from tetrafluoroethylene, hexafluoropropylene, trifluoroethylene, chlorofluoroethylene, 1,2-difluoroethylene, perfluoro(methylvinyl)ether, perfluoro(ethylvinyl)ether, perfluoro(propylvinyl)ether, difluoro(1,3-dioxole), perfluoro(2,2-dimethyl-1,3-dioxole), trichloroethylene and vinyl fluoride.

According to the fifteenth embodiment of the present disclosure, there is provided the separator as defined in any one of the eleventh to the fourteenth embodiments, wherein the low-resistance coating layer includes node(s) containing the inorganic particles and the polymer resin covering at least a part of the surfaces of inorganic particles, and filament(s) formed from the polymer resin of the node in a thread-like shape, at least one filament is extended from each node, and the filaments are arranged in such a manner that they connect one node with another node.

Advantageous Effects

The separator according to the present disclosure shows low resistance and suitable porosity and electrolyte retention, while ensuring heat resistance.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing. Meanwhile, shapes, sizes, scales or proportions of some constitutional elements in the drawings may be exaggerated for the purpose of clearer description.

BEST MODE

Figure 1:
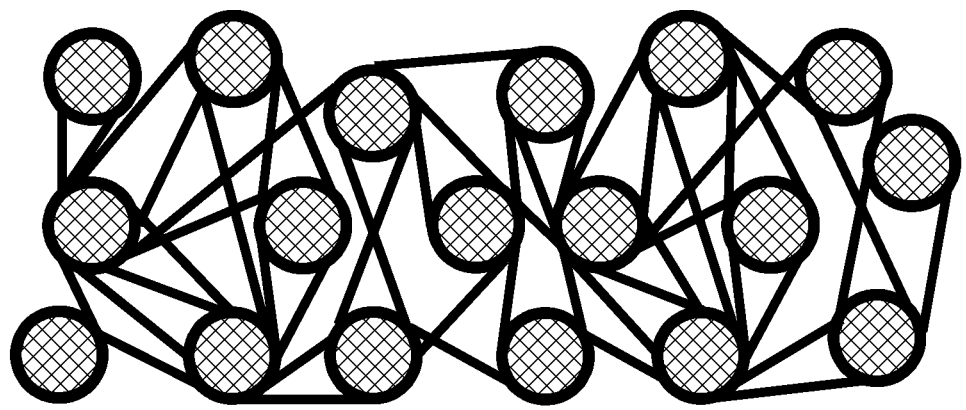
FIG. 1 is a schematic view illustrating the structure formed by the inorganic particles and binder resin in the low-resistance coating layer of the separator according to an embodiment of the present disclosure.
Figure 2:
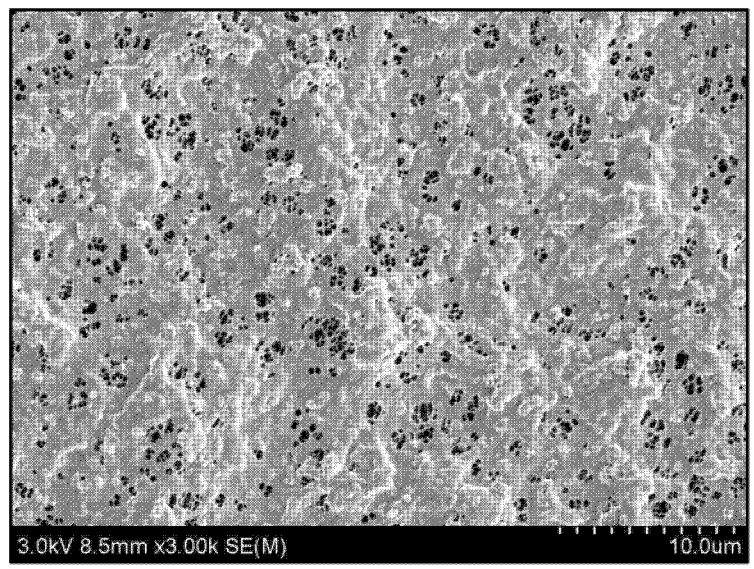
FIG. 2 is a scanning electron microscopic (SEM) image illustrating the surface of the separator prepared according to Example 1.
Figure 3:
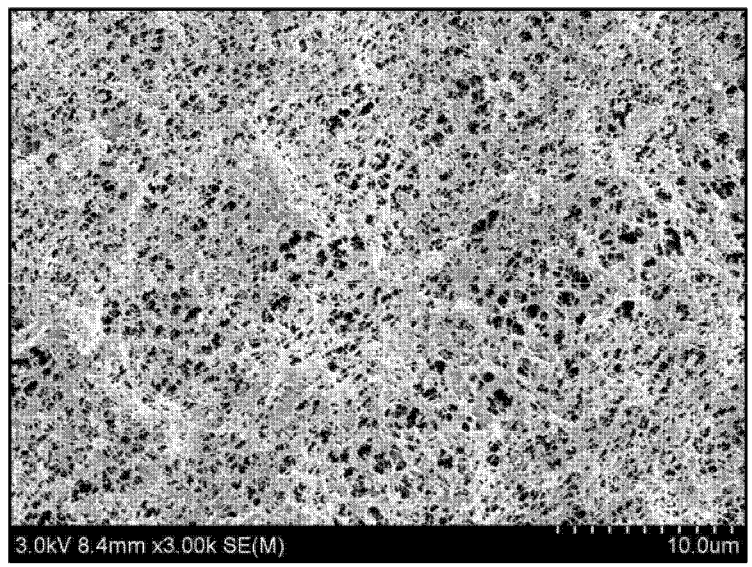
FIG. 3 is an SEM image illustrating the surface of the separator prepared according to Example 2.
Figure 4:
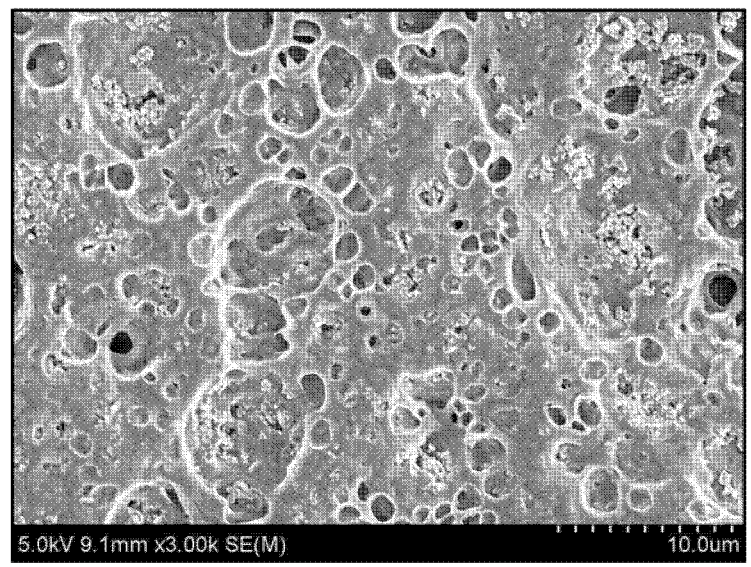
FIG. 4 is an SEM image illustrating the surface of the separator prepared according to Comparative Example 3.
Figure 5:
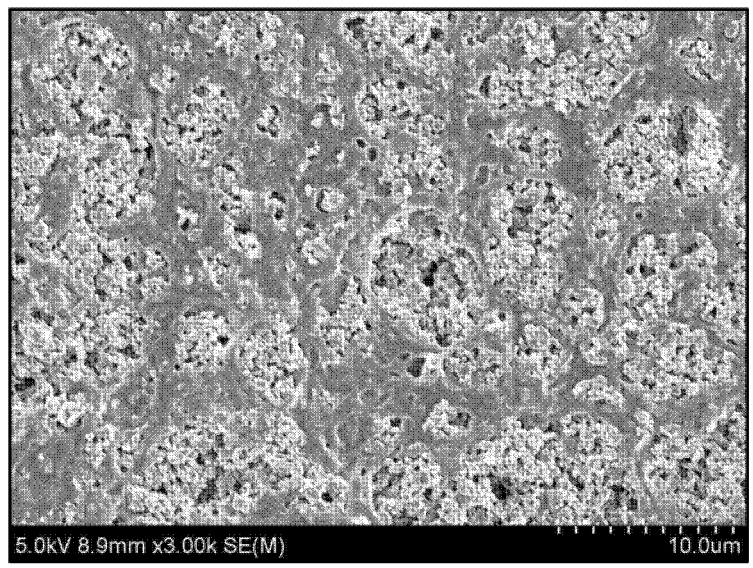
FIG. 5 is an SEM image illustrating the surface of the separator prepared according to Comparative Example 4.
Figure 6:
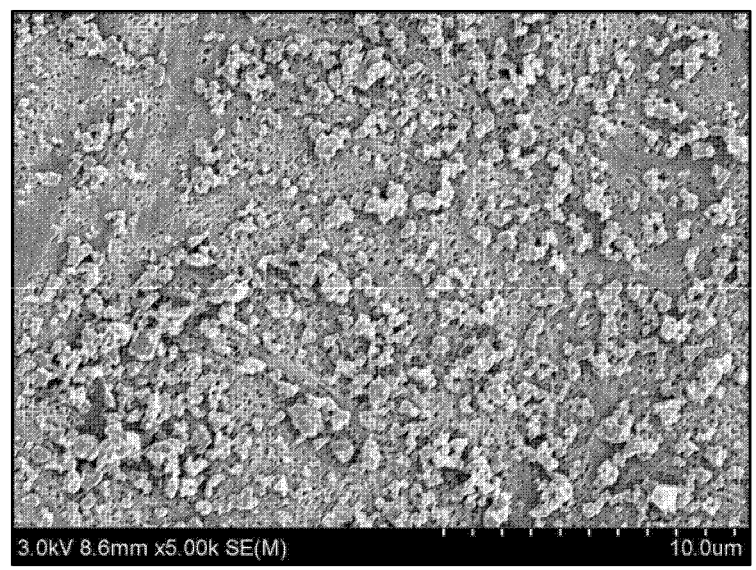
FIG. 6 is an SEM image illustrating the surface of the separator prepared according to Comparative Example 5.
Figure 7:
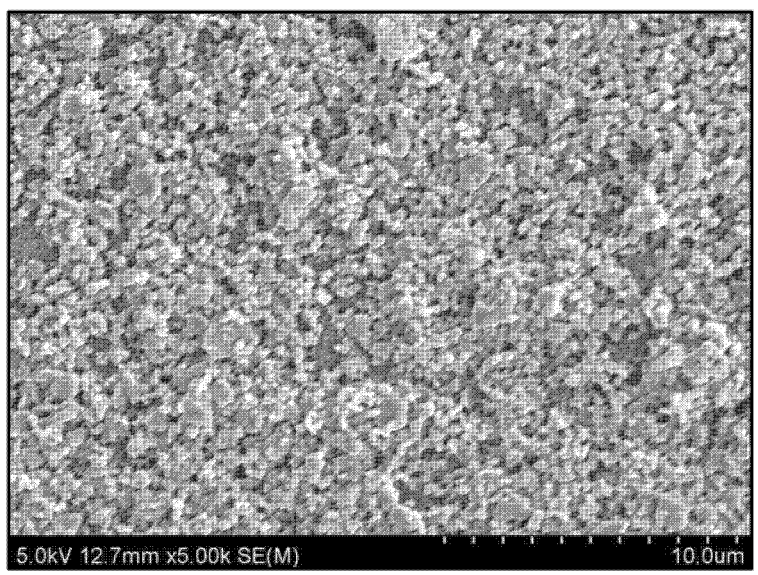
FIG. 7 is an SEM image illustrating the surface of the separator prepared according to Comparative Example 6.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Throughout the specification, the expression a part 'includes' an element does not preclude the presence of any additional elements but means that the part may further include the other elements.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the expression 'A and/or B' means 'A, B or both of them'.

Specific terms used in the following description are for illustrative purposes and are not limiting. Such terms as 'right', 'left', 'top surface' and 'bottom surface' show the directions in the drawings to which they are referred. Such terms as 'inwardly' and 'outwardly' show the direction toward the geometrical center of the corresponding apparatus, system and members thereof and the direction away from the same, respectively. 'Front', 'rear', 'top' and 'bottom' and related words and expressions show the positions and points in the drawings to which they are referred and should not be limiting. Such terms include the above-listed words, derivatives thereof and words having similar meanings.

In one aspect, there is provided a separator for an electrochemical device. Herein, the electrochemical device is a system in which chemical energy is converted into electrical energy through electrochemical reactions, has a concept including a primary battery and a secondary battery, wherein the secondary battery is capable of charging and discharging and has a concept covering a lithium ion battery, nickel-cadmium battery, nickel-metal hydride battery, or the like.

1. Separator (Structure of Separator) The separator according to the present disclosure includes a porous substrate including a plurality of pores and a low-resistance coating layer formed on the top of at least one surface of the porous substrate.

According to an embodiment of the present disclosure, the separator may have a thickness of 7-21 μm. In addition, the separator may have an increase in air permeation time less than about 40%, less than 30%, or less than 27%, based on the air permeation time of the porous substrate. According to the present disclosure, the increase in air permeation time refers to the ratio (percentage) of the difference between the air permeation time of the separator after the low-resistance coating layer is formed and that of the porous substrate, based on the air permeation time of the porous substrate, and may be calculated according to the following Formula 1:

Increase in air permeation time (%)={(Air permeation time of separator−Air permeation of porous substrate)/Air permeation time of porous substrate}×100     [Formula 1]

As used herein, the term 'air permeation time' refers to a time required for 100 cc of air to pass through an object, such as a separator or porous substrate, to be determined for air permeation time, may be expressed in the unit of second/100 cc, may be used interchangeably with 'permeation time', and generally is represented by Gurley value, or the like. According to an embodiment of the present disclosure, the air permeation time may be determined based on an air permeability tester, commercially referred as JIS P8117. In addition, air permeation time P1 determined for an object having a thickness of T1 may be converted into air permeation time P2 when the object has a thickness of 20 μm according to the formula of $P2=(P1\times20)/T1$.

1) Porous Substrate

The porous substrate means a porous ion-conducting barrier which allows ions to pass therethrough while interrupting an electrical contact between a negative electrode and a positive electrode, and has a plurality of pores formed therein. The pores are interconnected so that gases or liquids may pass from one surface of the substrate to the other surface of the substrate.

Materials forming the porous substrate may be any organic materials or inorganic materials having electrical insulation property. Particularly, with a view to imparting a shut-down function to a substrate, it is preferred to use a thermoplastic resin as a material forming the substrate. Herein, the term 'shut-down function' means a function of preventing thermal runaway of a battery by allowing a thermoplastic resin to be molten so that the pores of the porous substrate may be closed and ion conduction may be interrupted, when the battery temperature is increased. As a thermoplastic resin, a thermoplastic resin having a melting point less than 200° C. is suitable, polyolefin being particularly preferred.

In addition to polyolefin, the thermoplastic resin may include at least one polymer resin selected from polyethylene terephthalate, polybutylene terephthalate, polyacetal, polyamide, polycarbonate, polyimide, polyetherether ketone, polyether sulfone, polyphenylene oxide, polyphenylene sulfide and polyethylene naphthalene. The porous substrate may include a non-woven web, a porous polymer film, or a laminate of two or more layers thereof, but is not limited thereto.

Particularly, the porous polymer substrate is a porous film and may be any one of the following a) to e):

a) A porous film formed by melting and extruding a polymer resin;

b) A multilayer film formed by stacking two or more layers of the porous films of a);

c) A non-woven web formed by integrating filaments obtained by melting/spinning a polymer resin;

d) A multilayer film formed by stacking two or more layers of the non-woven webs of c); and
e) A porous composite film having a multilayer structure including two or more of a) to d).

According to the present disclosure, the porous substrate preferably has a thickness of 4-15 μm. When the thickness is smaller than the above-defined range, it is not possible to obtain a sufficient conducting barrier function. On the other hand, when the thickness is excessively larger than the above-defined range (i.e. the porous substrate is excessively thick), the separator may show excessively increased resistance.

According to an embodiment of the present disclosure, polyolefin preferably has a weight average molecular weight of 100,000-5,000,000. When the weight average molecular weight is smaller than 100,000, it is difficult to ensure sufficient dynamic physical properties. In addition, when the weight average molecular weight is larger than 5,000,000, shut-down characteristics may be degraded or molding may become difficult. In addition, the porous substrate may have a puncture strength of 300 gf or more in terms of improvement of production yield. The puncture strength of a porous substrate refers to the highest puncture load (gf) measured by carrying out a puncture test with Kato tech KES-G5™ hand compression tester under the conditions of a needle tip radius of curvature of 0.5 mm and a puncture rate of 2 mm/sec.

According to an embodiment of the present disclosure, the porous polymer substrate may be any porous polymer substrate as long as it is a planar porous polymer substrate used for an electrochemical device. For example, an insulating thin film showing high ion permeability and mechanical strength and generally having a pore diameter of 0.01-0.1 μm and a thickness of 3-20 μm or 4-15 μm may be used. Meanwhile, according to an embodiment of the present disclosure, the porous substrate preferably has a porosity of 30-70%.

2) Low-Resistance Coating Layer
A. Structure of Low-Resistance Coating Layer

According to the present disclosure, the separator includes a low-resistance coating layer formed on one surface of the porous substrate. The low-resistance coating layer includes a binder resin and inorganic particles, and the coating layer is a porous layer which has a plurality of micropores therein, wherein the micropores are interconnected, and allows gases or liquids to pass from one surface to the other surface. Although the binder resin will be described in detail in the following part, it includes a polyvinylidene fluoride (PVdF)-based binder resin, wherein the PVdF-based binder resin is present in an amount of 80 wt % or more, 90 wt % or more, or 99 wt % or more, based on 100 wt % of the total binder resin. According to an embodiment of the present disclosure, the binder resin may totally include a PVdF-based resin alone. In the low-resistance coating layer according to an embodiment of the present disclosure, the binder resin and inorganic particles may be present at a weight ratio of 30:70-60:40. According to the present disclosure, the low-resistance coating layer preferably shows a sufficiently porosified structure with a view to ion permeability.

According to an embodiment of the present disclosure, the low-resistance coating layer includes node(s) containing the inorganic particles and the polymer resin covering at least a part of the surfaces of inorganic particles, and filament(s) formed from the polymer resin of the node in a thread-like shape, at least one filament is extended from each node, and the filaments are arranged in such a manner that they connect one node with another node. Herein, such a structure of low-resistance coating layer may be referred to as a node-filament structure. FIG. 1 is a schematic view illustrating the surface of the low-resistance coating layer according to an embodiment of the present disclosure. Referring to FIG. 1, the low-resistance coating layer includes a plurality of filaments derived from the binder resin, the filaments cross one another to form a three-dimensional network structure like the structure of a non-woven web, and the inorganic particles are at least partially embedded in the filaments of binder resin in the network structure and are distributed while being spaced apart from one another by a predetermined interval through the filament(s). According to the present disclosure, the pores of the low-resistance coating layer mean the spaces formed by crossing of the filaments. Preferably, the inorganic particles are spaced by at least the average particle diameter of the inorganic particles with a view to ensuring high porosity. According to an embodiment of the present disclosure, the filaments preferably have a diameter smaller than the diameter of the nodes. In other words, the pores of the low-resistance coating layer according to the present disclosure have a unique node-filament composite and a porous structure formed thereby, which is different from a pore structure, such as a finger-like structure formed by diffusion of a binder resin in a non-solvent or a Bernard cell structure formed by partial opening of the portion including a binder resin.

Meanwhile, according to an embodiment of the present disclosure, the node-filament structure in the low-resistance coating layer is developed better in the horizontal direction of the low-resistance coating layer, as compared to the vertical direction thereof. As used herein, 'vertical direction' means the direction perpendicular to the porous substrate plane, and 'horizontal direction' means the direction parallel with the porous substrate plane. In other words, the node-filament structure may be identified better on the surface portion of the low-resistance coating layer, on the horizontal section of the low-resistance coating layer, or both. According to an embodiment of the present disclosure, in the vertical direction, the low-resistance coating layer shows the same node-filament structure as the horizontal direction, or the inorganic particles may be arranged while being in contact and integrated with one another and may be retained in a state bound with one another by the binder resin. In addition, according to the present disclosure, horizontal development of the node-filament structure may be realized effectively by the method for manufacturing a separator as described hereinafter. Thus, since the inorganic particles and binder resin of the low-resistance coating layer show the node-filament structure in the horizontal direction as described above, it is possible to ensure paths (pores) through which an electrolyte and/or lithium ions can be transported in the vertical direction of the low-resistance coating layer, even when the low-resistance coating layer is formed on the surface of the porous substrate. As a result, the separator according to the present disclosure shows significantly improved resistance characteristics.

According to an embodiment of the present disclosure, the low-resistance coating layer may have an average pore size of 10-900 nm, preferably 20-100 nm. The pore size may be calculated from the shape analysis through scanning electron microscopic (SEM) images, wherein the pore size is calculated by taking a closed curve formed by crossing of binder threads as a pore shape. According to an embodiment of the present disclosure, the pore size of the low-resistance coating layer may be determined by capillary flow porometry. The capillary flow porometry is a method by which the smallest pore diameter in the thickness direction is measured. Therefore, in order to measure only the pore size of the low-resistance coating layer through capillary flow porometry, it is required to separate the low-resistance coating layer from the porous substrate and to measure the pore size, while the separated low-resistance coating layer is surrounded with a non-woven web capable of supporting the low-resistance coating layer. Herein, the pore size of the non-woven web should be significantly larger than the pore size of the coating layer. According to an embodiment of the present disclosure, the low-resistance coating layer preferably has a porosity of 50-85%. When the porosity is 85% or less, it is possible to ensure dynamic property with which a pressing process for adhesion with an electrode can be tolerated, and to prevent an excessive increase in surface opening, thereby facilitating adhesion. Meanwhile, when the porosity is 50% or more, it is possible to provide preferred ion permeability, since it is higher than the porosity of the porous substrate.

Meanwhile, according to the present disclosure, the porosity may be determined by using BELSORP™ (BET system) available from BEL JAPAN Co., mercury intrusion porosimetry, capillary flow porosimetery, or the like. According to an embodiment of the present disclosure, the net density of an electrode active material layer is calculated from the density (apparent density) of a finished electrode (electrode active material layer) and the compositional ratio of ingredients contained in the electrode (electrode active material layer) and density of each ingredient. Then, the porosity of an electrode active material layer may be calculated from the difference between the apparent density and the net density.

The low-resistance coating layer may have a thickness of 0.5-5 μm on one side of the porous substrate. The thickness may be 0.5 μm or more, preferably 1 μm or more. Within the above-defined range, it is possible to obtain excellent adhesion with an electrode, thereby providing improved cell strength of a battery. Meanwhile, when the thickness is 5 μm or less, it is possible to provide a battery with preferred cycle characteristics and resistance characteristics. In this context, the thickness is preferably 4 μm or less, and more preferably 3 μm or less.

B. Materials for Low-Resistance Coating Layer

B1. Binder Resin

The low-resistance coating layer according to the present disclosure includes a binder resin, wherein the binder resin includes a polyvinylidene fluoride (PVdF)-based binder resin and the PVdF-based binder resin is present in an amount of 80 wt % or more, 90 wt % or more, or 99 wt % or more, based on 100 wt % of the total binder resin. According to an embodiment of the present disclosure, the binder resin may totally include a PVdF-based binder resin alone. According to an embodiment of the present disclosure, the PVdF-based binder resin has a weight average molecular weight of 600,000 or less, 400,000 or less, or 300,000 or less. When the weight average molecular weight is 600,000 or less, flexibility is increased to facilitate improvement of adhesion. In addition, when using a PVdF-based binder resin having a small weight average molecular weight, solubility to various solvents is increased to increase a degree of freedom in selecting a solvent, and pores are formed more uniformly upon the phase separation to provide low resistance desirably. Thus, considering this, the PVdF-based binder resin preferably has a weight average molecular weight of 400,000 or less. However, when the weight average molecular weight is less than 50,000, the binder resin may be dissolved in an electrolyte to cause an increase in viscosity of the electrolyte, resulting in degradation of ion conductivity. Therefore, the PVdF-based binder resin may have a weight average molecular weight of 50,000 or more. Herein, the weight average molecular weight of the PVdF-based binder resin may be determined by using Gel Permeation Chromatography (GPC).

According to the present disclosure, the PVdF-based binder resin may include vinylidene fluoride homopolymer, copolymer of vinylidene fluoride with another copolymerizable monomer, or a mixture thereof. Particular examples of the monomer copolymerizable with vinylidene fluoride may include at least one selected from tetrafluoroethylene, hexafluoropropylene, trifluoroethylene, chlorofluoroethylene, 1,2-difluoroethylene, perfluoro(methylvinyl)ether, perfluoro(ethylvinyl)ether, perfluoro(propylvinyl)ether, difluoro(1,3-dioxole), perfluoro(2,2-dimethyl-1,3-dioxole), trichloroethylene and vinyl fluoride. According to an embodiment of the present disclosure, the PVdF-based binder resin has a melting point (Tm) of 150° C. or lower, preferably 140° C. or lower with a view to adhesion upon hot adhesion. In this context, the binder resin may include a copolymer containing 70 mol % or more of vinylidene fluoride as polymerization unit. Herein, the copolymer may have a degree of substitution with another copolymerizable monomer of 5 mol % or more, or 8 mol % or more. Such a PVdF-based binder resin having a relatively smaller molecular weight may be obtained preferably through emulsion polymerization or suspension polymerization, and more preferably through suspension polymerization.

B2. Inorganic Particles

According to an embodiment of the present disclosure, the inorganic particles are not particularly limited, as long as they are electrochemically stable. In other words, the inorganic particles that may be used in the present disclosure are not particularly limited, as long as they cause no oxidation and/or reduction in the operating voltage range (e.g. 0-5V based on Li/Li$^+$) of an applicable electrochemical device. Particularly, when using inorganic particles having a high dielectric constant, they contribute to an increase in dissociation degree of the electrolyte salt, particularly lithium salt, in a liquid electrolyte, and thus can improve ion conductivity of the electrolyte.

For these reasons, the inorganic particles may include high-dielectric constant inorganic particles having a dielectric constant of 5 or more, preferably 10 or more. Non-limiting examples of the inorganic particles having a dielectric constant of 5 or more may include $BaTiO_3$, $Pb(ZrTi)O_3$ (PZT), $Pb_{1-x}La_xZr_{1-y}Ti_yO_3$ (PLZT, wherein 0<x<1, 0<y<1), $Pb(Mg_{1/3}Nb_{2/3})O_3$—$PbTiO_3$ (PMN-PT), hafnia ($HfO_2$), $SrTiO_3$, $SnO_2$, $CeO_2$, MgO, $Mg(OH)_2$, NiO, CaO, ZnO, $ZrO_2$, $SiO_2$, $Y_2O_3$, $Al_2O_3$, SiC, $Al(OH)_3$, $TiO_2$, or mixtures thereof.

In addition, the inorganic particles may be inorganic particles capable of transporting lithium ions, i.e. inorganic particles containing lithium elements, not storing lithium therein but transporting lithium ions. Non-limiting examples of the inorganic particles capable of transporting lithium ions include lithium phosphate ($Li_3PO_4$), lithium titanium phosphate ($Li_xTi_y(PO_4)_3$, 0<x<2, 0<y<3), lithium aluminum titanium phosphate ($Li_xAl_yTi_z(PO_4)_3$, 0<x<2, 0<y<1, 0<z<3), (LiAlTiP)$_x$O$_y$-based glass (1<x<4, 0<y<13), such as $14Li_2O$-$9Al_2O_3$-$38TiO_2$-$39P_2O_5$, lithium lanthanum titanate ($Li_xLa_yTiO_3$, 0<x<2, 0<y<3), lithium germanium thiophosphate ($Li_xGe_yP_zS_w$, 0<x<4, 0<y<1, 0<z<1, 0<w<5), such as $Li_{3.25}Ge_{0.25}P_{0.75}S_4$, lithium nitride ($Li_xN_y$, 0<x<4, 0<y<2), such as $Li_3N$, $SiS_2$-based glass ($Li_xSi_yS_z$, 0<x<3, 0<y<2, 0<z<4), such as $Li_3PO_4$—$Li_2S$—$SiS_2$, $P_2S_5$-based glass ($Li_xP_yS_z$, 0<x<3, 0<y<3, 0<z<7), such as $LiI$—$Li_2S$—$P_2S_5$, or mixtures thereof.

In addition, there is no particular limitation in the average particle diameter ($D_{50}$) of the inorganic particles. However, the inorganic particles preferably have an average particle diameter of 0.1-2.5 μm with a view to formation of a coating layer with a uniform thickness and suitable porosity. When the average particle diameter is smaller than 0.1 μm, dispersibility may be degraded. When the average particle diameter is larger than 2.5 μm, the resultant coating layer may have an increased thickness.

2. Method for Manufacturing Separator

The separator according to the present disclosure may be obtained by applying slurry for forming a low-resistance coating layer containing the PVdF-based binder resin and inorganic particles directly onto a porous substrate, and solidifying the PVdF-based binder resin to form a low-resistance coating layer integrally on the porous substrate.

Particularly, the binder PVdF-based resin is dissolved in a solvent first to prepare a polymer solution. Next, the inorganic particles are introduced to and mixed with the polymer solution to prepare slurry for forming a coating layer. Then, the slurry is applied onto the porous substrate and the coated porous substrate is dipped in a solidifying solution containing a suitable non-solvent for a predetermined time. During this step, the PVdF-based resin is solidified while phase separation occurs in the slurry. In this step, the low-resistance coating layer including the PVdF-based resin and inorganic particles is porosified. Then, the resultant product is washed with water to remove the solidifying solution, followed by drying, to form a low-resistance coating layer integrally on the porous substrate. According to an embodiment of the present disclosure, the slurry (containing the binder resin and the inorganic particles) preferably includes the PVdF-based resin at a concentration of 3-10 wt % based on 100 wt % of the slurry.

According to an embodiment of the present disclosure, the solvent may be one capable of dissolving the PVdF-based resin to 5 wt % or more, preferably 15 wt % or more, and more preferably 25 wt % or more, at 25° C. Non-limiting examples of such solvents include polar amide solvents, such as N-methyl pyrrolidone, dimethyl acetamide and dimethyl formamide, propanone, cyclopentanone, methyl acetate, gamma-butyrolactone, trimethyl phosphate, triethyl phosphate and dimethylethoxyethane. When the PVdF-based resin shows solubility in the solvent lower than the above-defined range, phase separation occurs excessively so that a low-resistance coating layer having a node-filament structure may not be formed. In the case of the following Comparative Example 5, acetone is used as a solvent. However, it can be seen that no node-filament structure is developed, since the PVdF-based resin shows significantly low solubility in acetone.

The non-solvent may be one providing a solubility of PVdF-based resin less than 5 wt % at 25° C. The non-solvent may be at least one selected from water, methanol, ethanol, propyl alcohol, butyl alcohol, butanediol, ethylene glycol, propylene glycol and tripropylene glycol.

According to an embodiment of the present disclosure, the solidifying solution may be the non-solvent alone, or a mixed solvent of the non-solvent with the above-mentioned solvent. When using the mixed solvent of the non-solvent with the solvent, the content of non-solvent may be 95 wt % or more based on 100 wt % of the solidifying solution in order to form a preferred porous structure and to improve productivity.

Meanwhile, according to an embodiment of the present disclosure, solidification of the PVdF-based resin may be carried out by preparing two or more types of solidifying solutions and dipping the separator coated with the slurry in each solidifying solution sequentially for a predetermined time. Herein, the solidifying solutions may be prepared in such a manner that the concentration of non-solvent may be increased sequentially as compared to the preceding step. In addition, the concentration of non-solvent at least in the secondary or later solidifying solution may be higher than the concentration of non-solvent in the initial solidifying solution. For example, the concentration of non-solvent in the initial solidifying solution may be 95 wt %, and that of non-solvent in the subsequent steps may be controlled to be higher than 95%.

While the solvent in the coating layer is exchanged with the solidifying solution, when the coating layer is dipped in the solidifying solution containing an excessive amount of non-solvent, the proportion of non-solvent in the coating layer is increased gradually. Thus, when a plurality of solidifying steps is carried out by preparing a plurality of solidifying solutions, it is preferred that the proportion of non-solvent in the solidifying solution is increased sequentially. Meanwhile, when the proportion of non-solvent in the initial solidifying solution is 100%, the solidifying solution used after the initial step includes the non-solvent alone.

According to an embodiment of the present disclosure, the solidifying solution may be maintained at a temperature equal to or higher than 5° C. and less than 20° C.

At a temperature lower than the above-defined range, condensation of the non-solvent occurs undesirably. At a temperature higher than the above-defined range, phase separation occurs rapidly so that the coating layer may not have a dense structure. As a result, it is not possible to form a coating layer having a desired node-filament structure. Moreover, the coating layer may locally have a structure in which the binder is excessively concentrated, which is not preferred in terms of resistance characteristics and adhesion. Meanwhile, when a plurality of solidifying steps is carried out by preparing a plurality of solidifying solutions, the initial solidifying solution may be set to a temperature equal to or higher than 5° C. and less than 20° C., while the secondary or later solidifying solution may have a temperature increasing sequentially before the drying step, and may be prepared at a temperature at least higher than the temperature of the initial solidifying solution. However, the temperature of the secondary or later solidifying solution is controlled preferably to 40° C. or less. At a temperature higher than the above-defined range, evaporation of the non-solvent occurs undesirably. At a temperature lower than the above-defined range, thermal impact is generated upon the introduction to a drying furnace to cause a change in width of a substrate.

The slurry may be applied by using a conventional coating process, such as a Meyer bar, die coater, reverse roll coater, gravure coater, or the like. When the low-resistance coating layers are formed on both surfaces of the porous substrate, the coating solution may be applied to each surface successively, and then solidified, washed with water and dried. However, it is preferred in terms of productivity that the coating solution is applied to both surfaces of the porous substrate at the same time, and then solidified, washed with water and dried.

Meanwhile, according to an embodiment of the present disclosure, the dipping time is controlled preferably within 1 minute. When the dipping time is larger than 1 minute, phase separation occurs excessively to cause degradation of adhesion between the porous substrate and the low-resistance coating layer, resulting in separation of the coating layer. Meanwhile, when a plurality of solidifying steps is carried out by preparing a plurality of solidifying solutions as described above, the dipping time in the initial solidifying solution is controlled to 3-25 seconds.

In addition, the separator according to the present disclosure may be obtained by preparing a low-resistance coating layer and a porous substrate separately, stacking the sheets, and forming a composite by hot pressing or adhesive. Methods for preparing the low-resistance coating layer as an independent sheet include a method including applying the slurry onto a release sheet, forming the low-resistance coating layer in the same manner as described above and removing only the low-resistance coating layer.

3. Electrode Assembly Including Separator

Meanwhile, the present disclosure provides a secondary battery including the separator. The battery includes a negative electrode, a positive electrode and a separator interposed between the negative electrode and the positive electrode, wherein the separator is the low-resistance separator having the above-described characteristics.

According to the present disclosure, the positive electrode includes a positive electrode current collector and a positive electrode active material layer formed on at least one surface of the current collector and containing a positive electrode active material, a conductive material and a binder resin. The positive electrode active material may include any one selected from: layered compounds, such as lithium manganese composite oxide ($LiMn_2O_4$, $LiMnO_2$, etc.), lithium cobalt oxide ($LiCoO_2$) and lithium nickel oxide ($LiNiO_2$), or those compounds substituted with one or more transition metals; lithium manganese oxides such as those represented by the chemical formula of $Li_{1+x}Mn_{2-x}O_4$ (wherein x is 0-0.33), $LiMnO_3$, $LiMn_2O_3$ and $LiMnO_2$; lithium copper oxide ($Li_2CuO_2$); vanadium oxides such as $LiV_3O_8$, $LiV_3O_4$, $V_2O_5$ or $Cu_2V_2O_7$; Ni-site type lithium nickel oxides represented by the chemical formula of $LiNi_{1-x}M_xO_2$ (wherein M is Co, Mn, Al, Cu, Fe, Mg, B or Ga, and x is 0.01-0.3); lithium manganese composite oxides represented by the chemical formula of $LiMn_{2-x}M_xO_2$ (wherein M=Co, Ni, Fe, Cr, Zn or Ta, and x=0.01-0.1) or $Li_2Mn_3MO_8$ (wherein M=Fe, Co, Ni, Cu or Zn); $LiMn_2O_4$ in which Li is partially substituted with an alkaline earth metal ion; disulfide compounds; and $Fe_2(MoO_4)_3$; or a mixture of two or more of them.

According to the present disclosure, the negative electrode includes a negative electrode current collector, and a negative electrode active material layer formed on at least one surface of the current collector and containing a negative electrode active material, a conductive material and a binder resin. The negative electrode may include, as a negative electrode active material, any one selected from: lithium metal oxide; carbon such as non-graphitizable carbon or graphite-based carbon; metal composite oxides, such as $Li_x Fe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, elements of Group 1, 2 or 3 in the Periodic Table, halogen; $0<x \leq 1$; $1 \leq y \leq 3$; $1 \leq z \leq 8$); lithium metal; lithium alloy; silicon-based alloy; tin-based alloy; metal oxides, such as AuO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$ and $Bi_2O_5$; conductive polymers, such as polyacetylene; Li—Co—Ni type materials; and titanium oxide; or a mixture of two or more of them.

According to an embodiment of the present disclosure, the conductive material may be any one selected from the group consisting of graphite, carbon black, carbon fibers or metal fibers, metal powder, conductive whiskers, conductive metal oxides, activated carbon and polyphenylene derivatives, or a mixture of two or more of such conductive materials. More particularly, the conductive material may be any one selected from natural graphite, artificial graphite, SUPER-P™, acetylene black, KETJEN BLACK™, channel black, furnace black, lamp black, thermal black, DENKA BLACK™, aluminum powder, nickel powder, zinc oxide, potassium titanate and titanium dioxide, or a mixture of two or more such conductive materials.

The current collector is not particularly limited, as long as it causes no chemical change in the corresponding battery and has high conductivity. Particular examples of the current collector may include stainless steel, copper, aluminum, nickel, titanium, baked carbon, aluminum or stainless steel surface-treated with carbon, nickel, titanium or silver, or the like.

The binder resin may be a polymer used currently for an electrode in the art. Non-limiting examples of the binder resin include, but are not limited to: polyvinylidene fluoride-co-hexafluoropropylene, polyvinylidene fluoride-co-trichloroethylene, polymethyl methacrylate, polyethylhexyl acrylate, polybutyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethy 1polyvinylalchol, cyanoethyl cellulose, cyanoethyl sucrose, pullulan, and carboxymethyl cellulose.

The electrode assembly prepared as described above may be introduced to a suitable casing and an electrolyte may be injected thereto to obtain a battery.

According to the present disclosure, the electrolyte is a salt having a structure of $A^+B^-$, wherein $A^+$ includes an alkali metal cation such as $Li^+$, $Na^+$, $K^+$ or a combination thereof, and $B^-$ includes an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof, the salt being dissolved or dissociated in an organic solvent selected from propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (γ-butyrolactone), ester compounds and mixtures thereof. However, the present disclosure is not limited thereto.

In addition, the present disclosure provides a battery module which includes a battery including the electrode assembly as a unit cell, a battery pack including the battery module, and a device including the battery pack as an electric power source. Particular examples of the device include, but are not limited to: power tools driven by the power of an electric motor; electric cars, including electric vehicles (EV), hybrid electric vehicles (HEV), plug-in hybrid electric vehicles (PHEV), or the like; electric two-wheeled vehicles, including E-bikes and E-scooters; electric golf carts; electric power storage systems; or the like.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1: Manufacture of Separator

Example 1

First, 35 g of PVdF-HFP (Solvay SOLEF™ 21510, $T_m$ 132° C., weight average molecular weight 300,000, HFP substitution degree 15 mol %) as a binder was dissolved in 400 g of NMP, and 65 g of $Al_2O_3$ (Japanese Light Metal Co., LS235™, D50 500 nm) was introduced thereto and dispersed through ball milling to prepare slurry.

Next, the slurry was coated onto both surfaces of a porous substrate made of polyethylene (ND9™ available from Shanghai Energy Co., thickness 9 μm, air permeation time 180 sec/100 cc, resistance 0.79 ohm, porosity 37%) sequentially through microgravure coating, and then dipped into a primary solidifying bath and a secondary solidifying bath sequentially to solidify the slurry. The primary solidifying bath included a solidifying solution containing NMP as a solvent and water as a non-solvent mixed at a weight ratio of 5:95, the solidifying solution was controlled to a temperature of 15° C., and the dipping time was 10 seconds. The secondary solidifying bath included a solidifying solution including water as a non-solvent alone, the solidifying solution was controlled to a temperature of 23° C., and the dipping time was 30 seconds. After the inorganic coating layer was solidified, it was removed from the solidifying solution and then the solvent and non-solvent remaining in the inorganic coating layer were dried at the same time to obtain a separator. The finished separator had a thickness of 17 μm, air permeation time of 210 sec/100 cc and a resistance of 1.04 ohm. After laminating the separators with each other at 100° C., a high peel force of 93 gf/25 mm was measured.

Example 2

A separator was obtained in the same manner as Example 1, except that each of the binder resin and the inorganic particles was used in an amount of 50 g.

The finished separator had a thickness of 17 μm, air permeation time of 222 sec/100 cc and a resistance of 1.10 ohm. A high peel force of 111 gf/25 mm was measured.

Example 3

A separator was obtained in the same manner as Example 1, except that the binder resin was KYNAR™ 2500 ($T_m$ 127° C., weight average molecular weight 230,000, HFP substitution degree 18 mol %). The finished separator had a thickness of 17 μm, air permeation time of 217 sec/100 cc and a resistance of 1.08 ohm. A high peel force of 108 gf/25 mm was measured.

Example 4

A separator was obtained in the same manner as Example 3, except that the slurry was coated onto both surfaces through dip coating instead of microgravure coating. The finished separator had a thickness of 17 μm, air permeation time of 219 sec/100 cc and a resistance of 1.09 ohm. The peel force was 113 gf/25 mm.

Example 5

A separator was obtained in the same manner as Example 1, except that NMP used in each step was changed into dimethyl acetamide. The finished separator had a thickness of 17 μm, air permeation time of 227 sec/100 cc and a resistance of 1.14 ohm. The peel force was 115 gf/25 mm.

Example 6

First, 35 g of PVdF-HFP (Solvay SOLEF™ 21510, $T_m$ 132° C., weight average molecular weight 300,000, HFP substitution degree 15 mol %) as a binder was dissolved in 400 g of NMP, and 65 g of $Al_2O_3$ (Japanese Light Metal Co., LS235™, D50 500 nm) was introduced thereto and dispersed through ball milling to prepare slurry.

Next, the slurry was coated onto both surfaces of a porous substrate made of polyethylene (ND9™ available from Shanghai Energy Co., thickness 9 μm, air permeation time 180 sec/100 cc, resistance 0.79 ohm, porosity 37%) sequentially through microgravure coating, and then dipped into a solidifying bath to solidify the slurry. The solidifying bath included a solidifying solution containing 100% of methanol as a non-solvent, the solidifying solution was controlled to a temperature of 18° C., and the dipping time was 10 seconds. Then, the resultant product was dipped into a secondary solidifying bath including a non-solvent containing water and methanol at a ratio of 50:50 and controlled to a temperature of 20° C. for 15 seconds. Finally, the resultant product was dipped into a tertiary solidifying bath including a non-solvent containing 100% of water and controlled to a temperature of 23° C. for 15 seconds. The finished separator had a thickness of 17 μm, air permeation time of 220 sec/100 cc and a resistance of 1.08 ohm. The peel force was 109 gf/25 mm.

Comparative Example 1

A separator was obtained in the same manner as Example 1, except that 15 g of the binder resin and 85 g of the inorganic particles were used. The finished separator had a thickness of 17 μm, air permeation time of 203 sec/100 cc and a resistance of 1.01 ohm. The peel force was 27 gf/25 mm.

Comparative Example 2

A separator was obtained in the same manner as Example 1, except that 70 g of the binder resin and 30 g of the inorganic particles were used. The finished separator had a thickness of 17 μm, air permeation time of 227 sec/100 cc and a resistance of 1.21 ohm. The peel force was 139 gf/25 mm.

Comparative Example 3

First, 18 g of PVdF-HFP (Solvay SOLEF™ 21510) as a binder and 2 g of cyanoethylene polyvinyl alcohol (Shin-Etsu, CR-V™) as a dispersing agent were dissolved in 400 g of acetone, and 80 g of $Al_2O_3$ (Japanese Light Metal Co., LS235™) was introduced thereto and dispersed through ball milling. Then, the resultant slurry was coated onto the same PO porous substrate as Example 1 and dried naturally at a relative humidity of 60% and 40° C. to obtain a separator.

In the case of Comparative Example 3, the binder resin moved toward the surface of the coating layer while the coating layer was dried, and thus the coating layer showed a layered structure having a lower portion enriched with the inorganic particles and an upper portion enriched with the binder resin. In the lower portion, the inorganic particles were packed and bound with one another in a dot-to-dot or face-to-face manner by means of the binder resin while being in close contact with one another. The lower portion included pores formed by the vacant spaces among the inorganic particles and showed no thread-like shape. In addition, the upper portion included the binder resin and was formed in the shape of a porous layer having Bernard cell-type pores.

The finished separator had a thickness of 17 μm, air permeation time of 481 sec/100 cc and a resistance of 1.41 ohm. The peel force was 73 gf/25 mm.

Comparative Example 4

A separator was obtained in the same manner as Comparative Example 3, except that 13 g of the binder resin and 85 g of $Al_2O_3$ were used. In the finished separator, the coating layer included an inorganic layer and a binder layer formed independently from each other, like Comparative Example 3. The finished separator had a thickness of 17 μm, air permeation time of 436 sec/100 cc and a resistance of 1.33 ohm. The peel force was 61 gf/25 mm.

Comparative Example 5

First, 18 g of PVdF-HFP (Solvay SOLEF™ 21510) as a binder and 2 g of cyanoethylene polyvinyl alcohol as a dispersing agent were dissolved in 400 g of acetone, and 80 g of $Al_2O_3$(Japanese Light Metal Co., LS235™) was introduced thereto and dispersed through ball milling to prepare slurry. Next, the slurry was coated onto the same porous substrate made of polyethylene as Example 1, and the resultant product was dipped into water to obtain a separator. Herein, water was controlled to a temperature of 20° C. and the dipping time was 30 seconds. Since PVdF-HFP showed low solubility (less than 10 wt %) to acetone used as a solvent, phase separation occurred rapidly and no stable coating layer was formed. The finished separator had an average thickness of 17 μm but showed a severe deviation. In addition, the air permeation time and resistance also showed a severe deviation so that any representative values could not be suggested. A low peel force of 18 gf/25 mm was measured.

Comparative Example 6

A separator was obtained in the same manner as Example 1, except that the primary solidifying solution included 100% of water and was controlled to a temperature of 35° C. and the dipping time was 40 seconds, and the secondary solidifying solution included 100% of water and was controlled to a temperature of 23° C. and the dipping time was 30 seconds. The finished separator had a thickness of 17 μm, air permeation time of 215 sec/100 cc and a resistance of 1.08 ohm. The peel force measured after laminating the separators with each other at 100° C. was 63 gf/25 mm. It is thought that since phase separation occurs rapidly in the hot non-solvent baths, the phase separation rate cannot be controlled and the binder cannot have preferred distribution and shape, resulting in degradation of adhesion.

Comparative Example 7

A separator was obtained in the same manner as Comparative Example 5, except that methanol was used as a non-solvent. The finished separator had an average thickness of 17 μm but showed a severe deviation. In addition, the air permeation time and resistance also showed a severe deviation so that any representative values could not be suggested. The peel force was 22 gf/25 mm.

Comparative Example 8

A separator was obtained in the same manner as Example 1, except that PVdF-HFP (KUREHA™ 8200, HFP substitution degree 2%, weight average molecular weight 800,000, $T_m$ 155° C.) was used as a binder. The finished separator had a thickness of 17 μm, air permeation time of 202 sec/100 cc and a resistance of 0.99 ohm. The peel force measured after laminating the separators with each other at 100° C. was 24 gf/25 mm.

Comparative Example 9

A separator was obtained in the same manner as Example 1, except that PVdF homopolymer (KUREHA™ 1100, HFP substitution degree 0%, weight average molecular weight 600,000, $T_m$ 178° C.) was used as a binder. The finished separator had a thickness of 17 μm, air permeation time of 200 sec/100 cc and a resistance of 0.96 ohm. The peel force measured after laminating the separators with each other at 100° C. was 11 gf/25 mm.

Peel Force Test

The separator sample obtained from each of Examples and Comparative examples was cut into a size of 100 mm (length)×25 mm (width) to prepare two test specimens. The two test specimens was stacked and subjected to hot pressing at 100° C. for 10 seconds to obtain a laminate. The laminate was fixed to an adhesion strength tester (LLOYD Instrument, LF PLUS™) and the upper separator specimen was peeled off at 25° C. and a rate of 25 mm/min with an angle of 180°, and the adhesion strength was measured.

TABLE 1

| | Thickness of separator (μm) | Air permeation time (sec/100 cc) | Peel force (gf/25 mm) | Increase in air permeation time (%) |
|---|---|---|---|---|
| Ex. 1-1 | 17 | 210 | 93 | 16.7 |
| Ex. 2-1 | 17 | 222 | 111 | 23.3 |
| Ex. 3-1 | 17 | 217 | 108 | 20.6 |
| Ex. 4-1 | 17 | 219 | 113 | 21.7 |
| Ex. 5-1 | 17 | 227 | 115 | 26.1 |
| Ex. 6-1 | 17 | 220 | 109 | 22.2 |
| Comp. Ex. 1-1 | 17 | 203 | 27 | 12.8 |
| Comp. Ex. 2-1 | 17 | 227 | 139 | 26.1 |
| Comp. Ex. 3-1 | 17 | 481 | 73 | 167.2 |
| Comp. Ex. 4-1 | 17 | 436 | 61 | 142.2 |
| Comp. Ex. 5-1 | 17 | Not available | 18 | Not available |
| Comp. Ex. 6-1 | 17 | 215 | 63 | 19.4 |
| Comp. Ex. 7-1 | 17 | Not available | 22 | Not available |
| Comp. Ex. 8-1 | 17 | 202 | 24 | 12.2 |
| Comp. Ex. 9-1 | 17 | 200 | 11 | 11.1 |

Example 2: Manufacture of Battery

Manufacture of Battery

A battery including each of the separators according to Examples and Comparative Examples was obtained. The battery including the separator according to Example 1-1 is designated as Example 1-2, and the other batteries of Examples and Comparative Examples are numbered in the same manner.

First, $LiNi_{0.8}Co_{0.1}Mn_{0.1}O_2$, PVdF and carbon black were mixed at a weight ratio of 97.0:1.5:1.5, and the resultant mixture was dispersed in 2-methyl-2-pyrrolidone to obtain positive electrode slurry. Next, the positive electrode slurry was coated on an aluminum current collector, followed by drying and pressing, to obtain a positive electrode. As a counter electrode, a negative electrode was obtained by mixing artificial graphite, a conductive material, CMC and acrylic copolymer as a binder were mixed at a weight ratio of 96:1:1:2, dispersing the resultant mixture in water to prepare negative electrode slurry, and then coating the negative electrode slurry on a copper current collector, followed by drying and pressing. Then, each of the separators according to Examples and Comparative Examples was interposed between the negative electrode and the positive electrode, and an electrolyte was injected thereto to obtain a coin cell. The electrolyte was prepared by mixing ethylene carbonate with ethyl methyl carbonate at a volume ratio of 1:2 and adding $LiPF_6$ thereto at a concentration of 1M.

Determination of Resistance

Each of the coin cells according to Examples and Comparative Examples was determined for electrical resistance through electrochemical impedance spectroscopic analysis results by using an analyzer (VMP3™, Bio logic science instrument) at 25° C. under the conditions of an amplitude of 10 mV and a scan range of 0.1 Hz to 1 MHz.

Evaluation of Safety

A nail was allowed to penetrate through each cell to cause an internal short-circuit and the maximum temperature caused by the short-circuit was determined. The maximum temperature is the highest temperature measured on the cell surface. As the maximum temperature is increased, safety is degraded.

TABLE 2

| | Resistance (ohm) | Maximum temperature (° C.) |
|---|---|---|
| Example 1-2 | 1.04 | 57 |
| Example 2-2 | 1.10 | 68 |
| Example 3-2 | 1.08 | 54 |
| Example 4-2 | 1.09 | 53 |
| Example 5-2 | 1.14 | 55 |
| Example 6-2 | 1.08 | 54 |
| Comp. Ex. 1-2 | 1.01 | 52 |
| Comp. Ex. 2-2 | 1.21 | 102 |
| Comp. Ex. 3-2 | 1.41 | 51 |
| Comp. Ex. 4-2 | 1.33 | 50 |
| Comp. Ex. 5-2 | Not available | 88 |
| Comp. Ex. 6-2 | 1.08 | 67 |
| Comp. Ex. 7-2 | Not available | 79 |
| Comp. Ex. 8-2 | 0.99 | 54 |
| Comp. Ex. 9-2 | 0.96 | 52 |

As can be seen from the above results, when the binder resin of a low-resistance coating layer shows no thread-like shape, like Comparative Examples 3-2, 4-2, 5-2 and 7-2, the separator shows high resistance. When the content of inorganic particles is excessively low, like Comparative Example 2-2, there is no effect of improving safety even when the separator is coated. In addition, when a non-uniform coating layer is formed, like Comparative Example 5-2, it is not possible to ensure safety.

What is claimed is:

1. A method for manufacturing a separator for an electrochemical device, which comprises:
   (S1) preparing a slurry for forming an inorganic coating layer, the slurry comprising a solvent, inorganic particles and a binder resin;
   (S2) applying the slurry for forming the inorganic coating layer to at least one surface of a porous substrate; and
   (S3) dipping the porous substrate coated with the inorganic coating layer in a solidifying solution containing a non-solvent,
   wherein the binder resin in the slurry comprises a vinylidene fluoride homopolymer or a copolymer of vinylidene fluoride with another copolymerizable monomer in an amount of 90 wt % or more based on 100 wt % of the binder resin, the vinylidene fluoride homopolymer or the copolymer of vinylidene fluoride with another copolymerizable monomer has a weight average molecular weight of 400,000 or less and a melting point of 140° C. or less,
   wherein a weight ratio of the binder resin to the inorganic particles in the slurry is at 30:70 to 60:40,
   wherein the dipping is carried out once, or twice or more, and an initial solidifying solution temperature is controlled to a temperature equal to or higher than 5° C. and less than 20° C.

2. The method according to claim 1, wherein the copolymer of vinylidene fluoride with another copolymerizable monomer comprises 70 mol % or more of the vinylidene fluoride as a polymerization unit and has a degree of substitution with the another copolymerizable monomer of 5 mol % or more.

3. The method according to claim 1, wherein the solidifying solution in the dipping comprises the non-solvent in an amount of 95 wt % or more based on 100 wt % of the solidifying solution.

4. The method according to claim 1, wherein the porous substrate comprises a thermoplastic resin having a melting point less than 200° C., and has a thickness of 4 μm-15 μm and a porosity of 30%-70%.

5. The method according to claim 1, wherein the separator shows a difference in air permeation time less than 40% based on an air permeation time of the porous substrate, and the difference in air permeation time is determined according to the following Formula 1, difference in air permeation time (%)={(air permeation time of separator–air permeation of porous substrate)/air permeation time of porous substrate}×100.  [Formula 1]

6. The method according to claim 1, wherein the inorganic particles cause no oxidation and/or reduction in an operating voltage range of 0-5V, based on $Li/Li^+$, of an electrochemical device, and have an average particle diameter $D_{50}$ of 0.1 μm-2.5 μm.

7. The method according to claim 1, wherein the solvent is capable of dissolving 10 wt % or more of the vinylidene fluoride homopolymer or the copolymer of vinylidene fluoride with another copolymerizable monomer at 25° C., and comprises at least one selected from N-methyl pyrrolidone, dimethyl acetamide or dimethyl formamide.

8. The method according to claim 1, wherein the dipping is carried out twice or more.

9. The method according to claim 1, wherein the solidifying solution comprises two or more types of solidifying solutions, and wherein the dipping is carried out by preparing the two or more types of solidifying solutions and dipping the porous substrate coated with the inorganic coating layer in each of the two or more types of solidifying solutions sequentially for a predetermined time.

10. The method according to claim 9, wherein an initial solidifying solution of the two or more types of solidifying solutions comprises the non-solvent in an amount of 95 wt % or more based on 100 wt % of the initial solidifying solution, and a content of non-solvent in a later used solidifying solution of the two or more types of solidifying solutions is higher than a content of non-solvent in the initial solidifying solution.

11. The method according to claim 9, wherein an initial solidifying solution of the two or more types of solidifying solutions is controlled to a temperature equal to or higher than 5° C. and less than 20° C., and a later used solidifying solution of the two or more types of solidifying solutions is controlled to a temperature higher than the temperature of the initial solidifying solution within a range up to the highest temperature of 40° C.

12. A separator for an electrochemical device obtained by the method as defined by claim 1 comprising:
the porous substrate and the inorganic coating layer formed on at least one surface of the porous substrate,
wherein the inorganic coating layer comprises the inorganic particles and the binder resin,
the separator shows a difference in air permeation time less than 40% as determined according to Formula 1, and
the inorganic coating layer comprises the binder resin and the inorganic particles at a weight ratio of 30:70-60:40, difference in air permeation time (%)={(air permeation time of separator−air permeation of porous substrate)/air permeation time of porous substrate}×100.  [Formula 1]

13. The separator according to claim 12, wherein the monomer copolymerizable with vinylidene fluoride comprises at least one of tetrafluoroethylene, hexafluoropropylene, trifluoroethylene, chlorofluoroethylene, 1,2-difluoroethylene, perfluoro(methylvinyl)ether, perfluoro(ethylvinyl)ether, perfluoro(propylvinyl)ether, difluoro(1,3-dioxole), perfluoro(2,2-dimethyl-1,3-dioxole), or trichloroethylene or vinyl fluoride.

14. A separator for an electrochemical device comprising:
a porous substrate and a coating layer formed on at least one surface of the porous substrate,
wherein the coating layer comprises a binder resin and inorganic particles at a weight ratio of 30:70-60:40;
the binder resin comprises 90 wt % or more of a vinylidene fluoride homopolymer or a copolymer of vinylidene fluoride with another copolymerizable monomer based on 100 wt % of the binder resin, and the vinylidene fluoride homopolymer or the copolymer of vinylidene fluoride with another copolymerizable monomer has a weight average molecular weight of 400,000 or less and a melting point of 140° C. or less;
the separator shows a difference in air permeation time less than 40% as determined according to Formula 1;
and the coating layer includes nodes containing the inorganic particles and the binder resin covering at least a part of surfaces of the inorganic particles, and filaments formed from the binder resin of the nodes in a thread-like shape, wherein at least one of the filaments is extended from each of the nodes, and the filaments are arranged in such a manner that they connect one of the nodes with another one of the nodes:

difference in air permeation time (%)={(air permeation time of separator−air permeation of porous substrate)/air permeation time of porous substrate}×100.  [Formula 1]

* * * * *